(No Model.)

E. D. PRIEST.
ELECTRIC RAILWAY MOTOR.

No. 508,633. Patented Nov. 14, 1893.

WITNESSES.
Alec F. Macdonald.

INVENTOR.
Edward D. Priest
By Buckley & Blodgett
Attys.

UNITED STATES PATENT OFFICE.

EDWARD D. PRIEST, OF LYNN, ASSIGNOR TO THE GENERAL ELECTRIC COMPANY, OF BOSTON, MASSACHUSETTS.

ELECTRIC-RAILWAY MOTOR.

SPECIFICATION forming part of Letters Patent No. 508,633, dated November 14, 1893.

Application filed February 23, 1893. Serial No. 463,318. (No model.)

*To all whom it may concern:*

Be it known that I, EDWARD D. PRIEST, a citizen of the United States, residing at Lynn, county of Essex, and State of Massachusetts, have invented certain new and useful Improvements in Electric Railway Motors, of which the following is a specification.

My invention relates to electric motors for propelling railway cars, and its object is to prevent wear and injurious pounding on the axles and bearings.

The improvements relate more especially to heavy motors whose armatures are concentric with and supported on the car axles, the field magnets being hung on the truck frame, which rests directly on the axle boxes in order to preserve the concentricity of the pole pieces and the armature. This arrangement causes severe pounding on the axle journals when the car runs rapidly over low joints, frogs and switches, or even slight irregularities in the road. My invention aims to obviate this difficulty, by making the pole pieces separate from the field magnet cores, and supporting the pole pieces only in fixed relation to the armature, the other portions of the field magnet being mounted on springs so as to permit them to have a limited vertical play and thus relieve the axle journals and bearings from the shocks to which they would otherwise be subjected by the heavy frame, cores and coils of the field magnet.

Figure 1:
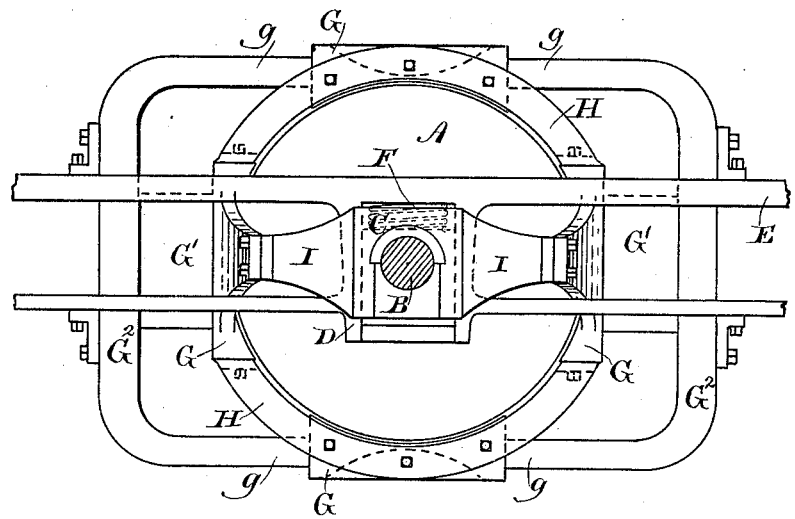
Figure 2:
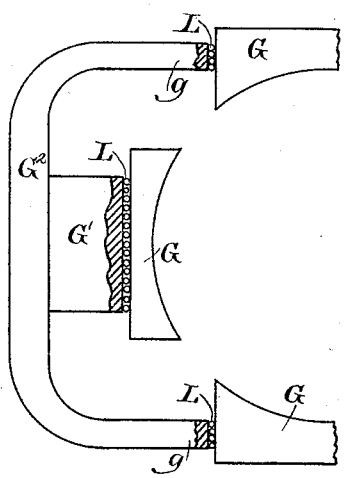
Figure 3:
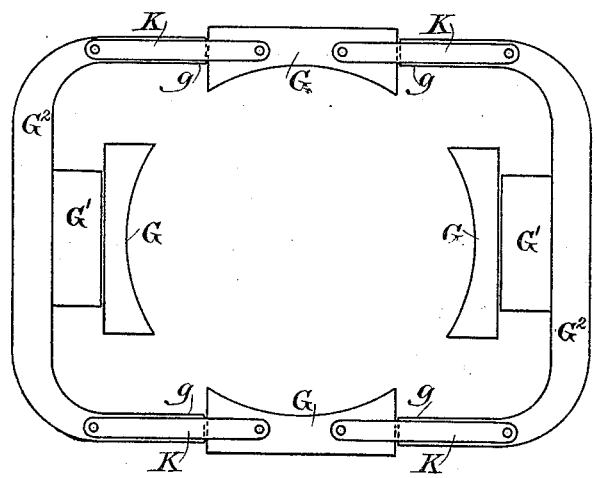

In the drawings Figure 1 represents the framework of a motor embodying my invention. Figs. 2 and 3 illustrate different modifications of construction.

The armature A is mounted directly on the axle B, which is journaled in axle boxes C sliding in pedestals D forming part of the truck frame E. Suitable springs F are interposed between the frame and the top of the axle box to take up the shock and give the frame an elastic support. The pole pieces G of the field magnets may be of any suitable number, and are made separate and detached from the cores G'. They are rigidly supported in fixed relation to the armature, and concentric therewith. This may be conveniently accomplished by attaching them to loops H supported on arms I extending from the axle boxes.

The frame $G^2$ of the field magnet, carrying the cores G', is mounted on the truck frame, so that it partakes of the vertical play of the frame with reference to the axle, which is relieved by the spring F from all pounding of these heavy parts. The ends of the cores and the extremities $g$ of the frame approach closely to or are in contact with the pole pieces, so that the magnetic field is practically unimpaired. But since these surfaces of contact are all in vertical planes, the movement of the field magnet takes place without disturbing or changing the position of the pole pieces with reference to the armature.

In case it is found desirable to prevent actual contact between the pole pieces and the other parts of the field magnet, radius links K may be used connecting the extremities $g$ with the adjacent pole pieces, which preserve a space between the parts while at the same time permitting them to move freely in a vertical direction.

Instead of radius links, rollers or balls L may be used interposed between the pole pieces and the adjacent movable parts. These also serve to reduce the friction, and offer less resistance to the magnetic circuit than the air spaces shown in Fig. 3.

What I claim as new, and desire to secure by Letters Patent, is—

1. An electric motor having its pole pieces loose and separate from the remainder of its field magnet, substantially as described.

2. An electric motor having its pole pieces arranged in substantially fixed relation to its armature and the remainder of its field magnet movable with relation to said pole pieces, substantially as set forth.

3. An electric motor having its pole pieces rigidly mounted in fixed relation to its armature, and the remainder of its field magnet elastically mounted, substantially as described.

4. An electric motor having fixed pole pieces, the remaining parts of the field magnet being movable, and the adjacent relatively movable surfaces being in parallel planes, substantially as set forth.

5. The combination with an electric motor having fixed pole pieces, the remaining parts of the field magnet being movable, of means for preventing contact of the pole pieces with the adjacent parts of the field magnet, substantially as described.

6. The combination with an electric motor having fixed pole pieces, the remaining parts of the field magnet being movable, of rollers interposed between the pole pieces and the adjacent movable parts of the field magnet, substantially as set forth.

In witness whereof I have hereunto set my hand this 20th day of February, 1893.

EDWARD D. PRIEST.

Witnesses:
JOHN W. GIBBONEY,
BENJAMIN B. HULL.